United States Patent [19]

Bath

[11] Patent Number: 4,657,411

[45] Date of Patent: Apr. 14, 1987

[54] HYDRAULICALLY SUPPORTED THRUST BEARINGS

[75] Inventor: Duncan T. Bath, Peterborough, Canada

[73] Assignee: Canadian General Electric Company Limited, Toronto, Canada

[21] Appl. No.: 900,317

[22] Filed: Aug. 25, 1986

[30] Foreign Application Priority Data

Sep. 13, 1985 [CA] Canada .................................. 490652

[51] Int. Cl.⁴ ........................ F16C 27/00; F16C 17/06
[52] U.S. Cl. ..................................... 384/99; 384/303; 384/308
[58] Field of Search .......................... 384/99, 121–124, 384/105, 302–312; 310/90

[56] References Cited

U.S. PATENT DOCUMENTS

| | | | |
|---|---|---|---|
| 1,349,157 | 8/1920 | Kingsbury | 384/303 X |
| 1,421,208 | 6/1922 | Gauldie | 384/308 |
| 2,565,116 | 8/1951 | Baudry | 384/308 |
| 2,986,431 | 5/1961 | Block et al. | 384/308 |
| 3,398,996 | 8/1968 | Wucherer | 384/99 |

FOREIGN PATENT DOCUMENTS

| | | | |
|---|---|---|---|
| 187759 | 11/1956 | Austria | 384/303 |
| 695080 | 9/1964 | Canada | 384/303 |
| 1116671 | 1/1982 | Canada | |
| 1183313 | 12/1964 | Fed. Rep. of Germany | 384/303 |

Primary Examiner—Stuart S. Levy
Assistant Examiner—Thomas R. Hannon
Attorney, Agent, or Firm—Raymond A. Eckersley

[57] ABSTRACT

A thrust bearing particularly suitable for use with a vertical shaft machine has a rotating ring mounted to the shaft for rotation with the shaft and having a downwardly directed bearing surface. A base ring is positioned around the shaft and fixedly mounted to a machine foundation. A plurality of segmented bearing shoes extend around the shaft and have upwardly directed bearing surfaces for bearing engagement with the bearing surface of the rotating ring. Each shoe is supported from the base ring by a plurality of hydraulic elements which in one form are cylinders fixed to the base ring with pistons extending axially therefrom to engage the respective bearing shoe. Each cylinder is connected to a manifold to provide to each cylinder a hydraulic fluid under pressure. Because the source is common, each cylinder has hydraulic fluid at the same pressure. The hydraulic elements (cylinders and pistons) for each shoe, are distributed or arranged in a pattern which provides a substantially planar surface to each bearing shoe under load.

8 Claims, 9 Drawing Figures

HYDRAULICALLY SUPPORTED THRUST BEARINGS

BACKGROUND OF THE INVENTION

This invention relates to hydraulically supported thrust bearings, and in particular it relates to hydraulically supported thrust bearings for large vertical-shaft dynamoelectric machines Thrust bearings for large vertical-shaft machines usually comprise a downwardly facing ring that is mounted to the rotating component of the machine and a plurality of shoes or bearing segments with upwardly directed bearing surfaces. The bearing segments support the rotating ring on an oil film which is usually provided by having the segments and the ring submerged in an oil bath.

In order to align the surface of the shoes with the surface of the rotating ring, it is known to mount each shoe on a pivot located near the centre of the shoe and arranged to permit the shoe to tilt down slightly at the leading edge to form the oil film into a slight wedge-shaped configuration. This tends to improve the load carrying capability and to reduce the temperature of the components. In its basic form, however, this arrangement may be vulnerable to conditions which cause the total bearing load to be unevenly apportioned amongst the individual shoes. Some effort has been directed to alleviating this difficulty, as for example, by the provision of a system of equalizing levers. One example of the use of equalizing levers is described in U.S. Pat. No. 2,565,116 to Baudry, issued Aug. 21, 1951.

There is another problem involved in the use of a basic pivotted shoe design, and that arises because each shoe is supported near the geometrical centre of its lower surface. An ideal oil film pressure distribution on the upper or bearing surface of each shoe would extend substantially to the perimeter of the shoe, although decreasing in intensity as the perimeter is approached. The ideal pressure distribution is difficult to achieve. Because of the central position of the shoe support, and a more general oil film pressure distribution, the shoe tends to distort so that its upper surface has a generally convex upward shape. Since this is a departure from the desirable planar condition, the oil film pressure profile and the operating characteristics of the bearing are degraded. In addition to this, there tends to be a thermal gradient within the shoe. That is, the shoe tends to be hotter at the top than at the bottom. This thermal gradient will tend to reinforce the distortion towards forming a convex surface. The larger the radial or circumferential dimensions of the shoe, the greater is the tendency for the shoe surface to crown or become slightly convex.

It is also known to support each shoe on a plurality of springs distributed beneath each shoe. The springs are designed with sufficient resilience to enable each shoe to tilt slightly as if it were effectively on a pivot and so that the total bearing load is distributed on and between each shoe. Because the shoe support is not concentrated near the centre of the shoe, but provides a distributed support pattern, the shoe can be made thinner without causing an undesirable crowning of the shoe. Because the shoe can be made thinner and more flexible, the tendency to crown or distort due to thermal gradients is reduced and the ability of the shoe to adapt to shape changes in the rotating ring is improved. However, the formation of an optimum oil pressure profile may be hindered because the distribution of shoe support now tends to be too strong towards the periphery of the shoe thus causing the bearing surface of the shoe to take a concave shape.

Another known thrust bearing design uses a single hydraulic element beneath each shoe. Canadian Pat. No. 695,080—Block et al, issued Sept. 29, 1964 describes one arrangement of hydraulic thrust bearing support by way of example. The hydraulic element can be in the form of a cylinder with a piston or can be a chamber formed with flexible walls such as bellows. The hydraulic elements are connected together by a manifold to ensure that the total thrust bearing load will be evenly distributed between all the shoes. Further, the hydraulic element may be designed with a certain limited amount of angular flexibility so that it can perform the function of a pivot. This small amount of pivoting action permits the shoe surface to align itself with the plane of the rotating ring as well as permitting sufficient tilt to form a hydrodynamic oil film. However, as with mechanical pivot support referred to above, there are problems in avoiding the tendency to crown, that is in avoiding the tendency of the shoe surface to become convex with the resulting degradation of the oil film pressure profile.

In order to compensate for uneven deflection of the inclinable support member, a thrust bearing arrangement is described in Canadian Pat. No. 1,116,671—Starcevic, issued Jan. 19, 1982, which includes a plurality of mechanical support elements for each bearing shoe. A mechanical pivot supports a relatively thick support member or backing plate for each shoe. The shoe, which is thinner than the support member, is supported above the pivoted support member by a plurality of mechanical support elements which extend between the support member and the bottom of the shoe. Each support element is designed with a predetermined compressive stiffness so that deflections in the support member under load are compensated for thus purportedly providing a bearing surface which is substantially planar.

SUMMARY OF THE INVENTION

The present invention achieves a combination of advantageous features of a spring supported shoe bearing arrangement and a hydraulically supported shoe bearing arrangement with predetermined support distribution for each shoe. Each shoe is supported from a fixed base ring with a plurality of hydraulic elements extending from the base ring to the shoe, each hydraulic element having a passageway connecting it with an external hydraulic manifold. This equalizes the pressure not only between shoes but between hydraulic elements associated with individual shoes. The hydraulic elements extend upwardly from the base ring to support the shoes. For each shoe, the plurality of hydraulic elements are distributed in a desired predetermined pattern. The improved support distribution permits the use of relatively thin shoes which, because of their increased flexibility, will reduce the influence of thermal gradients both in the shoe itself and in the rotating ring. It will also reduce the influence of surface manufacturing imperfections on the oil film pressure profile. The improved support distribution provides for the larger ratios of radial length to circumferential width that are associated with prior art spring supported shoes while avoiding problems arising from distortion in the sub-support structure. The hydraulic elements may have a common working diameter or may have different working diameters.

It is an object of the invention to provide an improved hydraulically supported thrust bearing.

It is another object of the present invention to provide a thrust bearing for a large vertical shaft machine having an improved bearing shoe support arrangement.

It is yet another object of the present invention to provide a thrust bearing structure having hydraulic support for each bearing shoe, the hydraulic support being advantageously distributed over the lower shoe surface.

Accordingly there is provided a thrust bearing vertical shaft machine, comprising a rotating ring mounted to the vertical shaft of said machine for rotation with said shaft and having a downwardly directed bearing surface, a fixed base ring positioned around said shaft, a plurality of segmented bearing shoes, each having an upwardly directed bearing surface facing the bearing surface of said rotating ring, a plurality of hydraulic elements for each of said shoes, said hydraulic elements extending upwardly from said base ring to support a respective shoe, a manifold connected to a source of hydraulic fluid under pressure, connection means connecting each said hydraulic element to said manifold to provide said hydraulic fluid under pressure to each said hydraulic element for urging the bearing surface of said respective shoe towards the bearing surface of said rotating ring, and means for providing a film of oil between the bearing surfaces of said shoes and the bearing surface of said rotating ring, said hydraulic elements for each said shoe being distributed and arranged to support said respective shoe in a pressure pattern which approximates an ideal oil film pressure pattern for providing a substantially planar bearing surface of said shoe under operating load conditions.

BRIEF DESCRIPTION OF THE DRAWINGS

The invention will be described with reference to the accompanying drawings, in which.

DESCRIPTION OF THE PREFERRED EMBODIMENT

Figure 1:
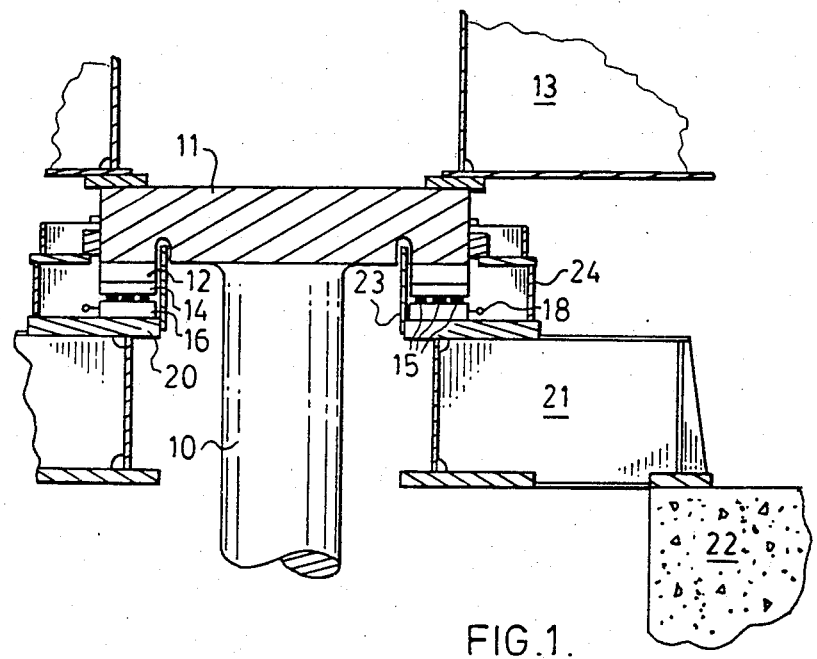
FIG. 1 is a sectional elevation showing a machine shaft with the bearing support according to the invention.

Referring to FIG. 1, there is shown a bearing mounting and support for a vertical shaft dynamoelectric machine such as a generator. A vertical shaft 10 extends downwardly to a water driven turbine (not shown). At the upper end of shaft 10 is a coupling flange 11 to which is coupled a generator rotor indicated by structure 13 but not shown in full. To the underside of flange 11, there is mounted a rotating ring 12. The rotating ring 12 is backed by the relatively massive flange 11 which serves as a thrust block. Ring 12 has a downwardly directed bearing surface. Facing the ring 12 is a plurality of bearing segments or shoes 14 each with an upwardly directed bearing surface. The shoes 14 are spaced adjacent one another around shaft 10 as is known. A plurality of hydraulic elements 15, such as pistons each in a cylinder arranged for movement of the pistons in an axial direction, or such as chambers with flexible side walls providing for axial movement of the upper chamber wall with respect to the lower chamber wall, extend from a base ring 16 to a respective shoe 14. A tubular passage 17 (FIG. 2) extends from each hydraulic element to a manifold 18 spaced from and adjacent base ring 16. The base ring 16 is supported on a heavy backing ring 20 which is mounted to a frame 21. The frame 21 is mounted to the foundation structure 22. Walls 23 and 24 extend upwardly from the backing ring 20 to form an enclosure or container for oil. When the machine is operating, the surfaces of rotating ring 12 and shoes 14, which are immersed in oil, have between them a hydrostatic oil film for lubricating and cooling the bearing surfaces.

Figure 2:
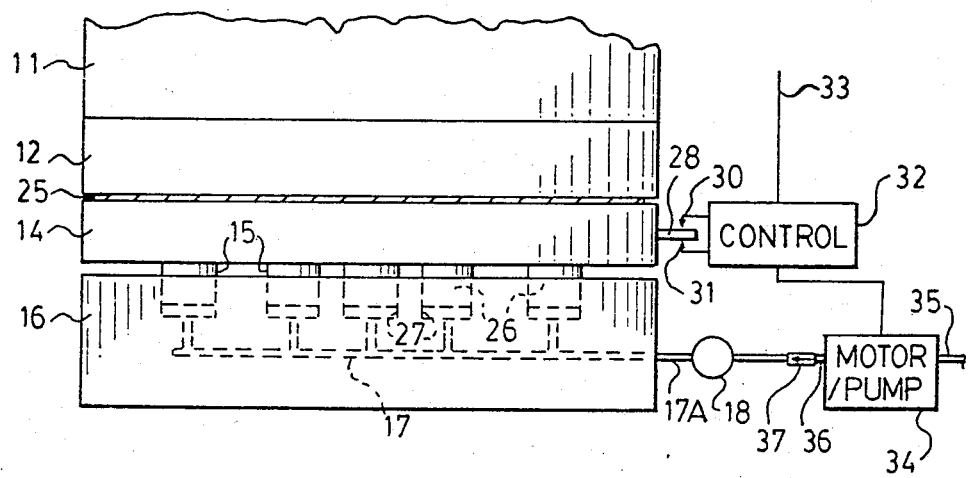
FIG. 2 is an enlarged view of the bearing and support structure shown in the right portion of FIG. 1.

In FIG. 2, which is an enlarged view of the bearing elements in the right portion of FIG. 1, the coupling flange 11 (or thrust block) is shown with the rotating ring 12 mounted to it. A shoe 14 is shown supporting the ring 12 with an oil film 25 indicated between them. A plurality of hydraulic elements 15 is shown extending across the shoe 14 to support it. The hydraulic elements 15 are shown as pistons 26 slidingly mounted in respective cylinders 27. A tubular passage 17 within base ring 16 interconnects the bottom of each cylinder 27 and is connected by pipe 17A with a manifold 18. The cylinders are connected in this manner to manifold 18 to ensure the pressure in each cylinder is the same.

As an alternative to using cylinders with pistons as the hydraulic elements, it is possible to use bellows type chambers which are flexible in a longitudinal direction in response to changes in volume of hydraulic fluid in the chamber.

In order to keep the shoes 14 at a predetermined level, that is within an upper and a lower limit, an arm 28 is provided extending from a shoe 14. An upper and a lower microswitch 30 and 31, shown symbolically, are operated by arm 28. The microswitches are connected to a control 32 which is connected between a source of electrical power, represented by power line 33, and a motor/pump combination 34. The pump of the motor/pump 34 is connected to a source of hydraulic fluid, represented by pipe 35, and through pipe 36 and check valve 37 to manifold 18. When the shoe 14 reaches a lower predetermined limit, arm 28 operates switch 31 which actuates control 32. Control 32 applies power to the motor of motor/pump 34 and the pump operates pumping hydraulic fluid through pipe 36, check valve 37, manifold 18, pipe 17A, passages 17, to cylinders 27, thereby raising pistons 26 and shoe 14. When shoe 14 reaches its upper predetermined limit, arm 28 engages switch 30 which actuates control 32 to switch off power to the motor of motor/pump 34. This keeps the shoe 14 with the arm 28 between the upper and lower predetermined limits, and because manifold 18 provides the same hydraulic pressure to all cylinders, all the shoes tend to remain within the upper and lower predetermined limits.

It is convenient, but not necessary, to use, as the hydraulic fluid, the same oil that is used to lubricate the bearings. If the same oil is used, then any leakage from any of the hydraulic elements will become part of the oil bath in which the bearing surfaces are immersed.

Figure 3A:
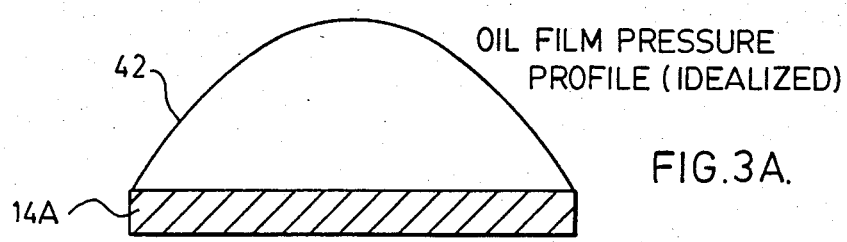
FIG. 3A is a representation of an oil film pressure profile such as might exist during running of a vertical machine having a thrust bearing.
Figure 3B:
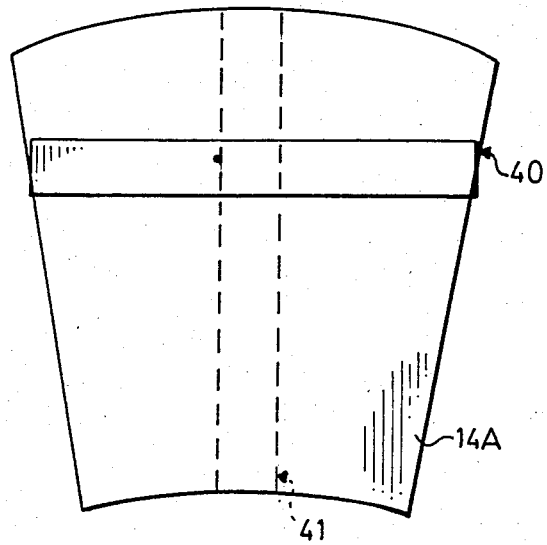
FIG. 3B is a plan view of a bearing shoe segment showing a transverse and radial element useful in understanding the invention.

Referring now to FIGS. 3A and 3B, there is shown in FIG. 3B a plan view of a bearing segment or shoe 14A. To provide a better understanding of the invention, we can consider an elemental strip 40 extending transversely. A radially extending elemental strip 41 is also shown. FIG. 3A shows a cross-section of shoe 14A taken through the elemental strip 40. It is possible, using some assumptions, to calculate the preferred distribution of pressures within the oil film on the bearing surface of each shoe. A curve 42 represents, for the purpose of this explanation, the oil film pressure profile above shoe 14A at the elemental strip 40, that is it represents an idealized operating pressure profile on the elemental strip 40.

Figure 4A:
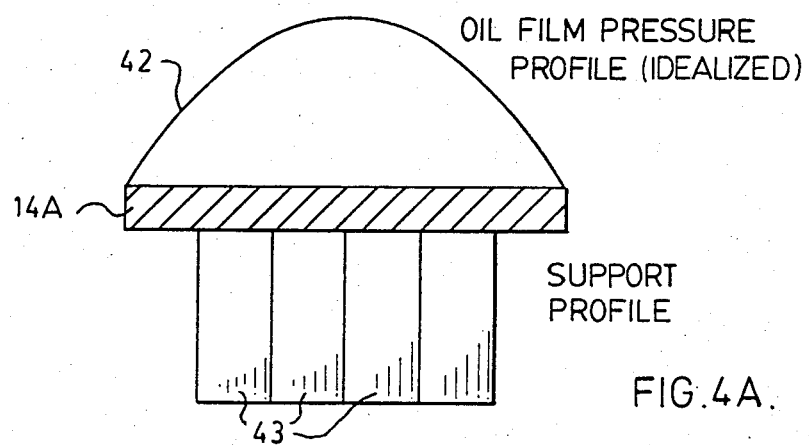
FIG. 4A is a representation of a shoe having an idealized oil film pressure profile and a particular support profile.
Figure 4B:
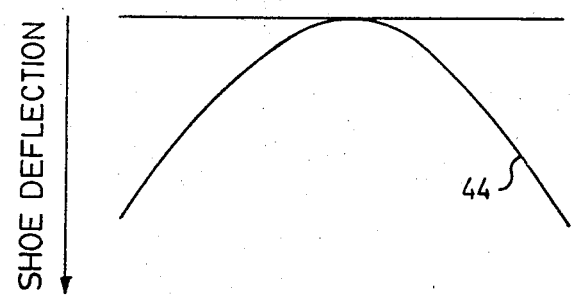
FIG. 4B is a curve indicating, as an example, a shoe deflection that might be associated with the load and support profiles of FIG. 4A.

Referring to FIG. 4A, the same oil film pressure profile as represented by curve 42 is shown, and the same cross-section through 14A at elemental strip 40. Shown beneath the cross-section of shoe 14A is the support effort provided by the pistons 26 (FIG. 2). The support effort is shown by several blocks 43 each having a block width which is representative of piston diameter and a block height which is representative of cylinder pressure. For equilibrium, the area under the oil film pressure profile 42 must be equal to the sum of the areas of the support effort blocks 43 as shown. In FIG. 4A, there are four support blocks 43 shown and they represent four cylinders distributed in a closely spaced arrangement near the centre of the strip element. Given all the factors, including width, thickness, length and modulus of elasticity of the elemental strip, it is possible to calculate by known means the deflection response of the elemental shoe strip. FIG. 4B shows, as an example, shoe deflection (exaggerated in scale) under the assumed conditions. Because the support effort is concentrated towards the centre, the shoe tends to deflect downwardly at the edges under the assumed load as represented by curve 44. In other words, the shoe strip being considered is convex upwards or "crowned".

Figure 5A:
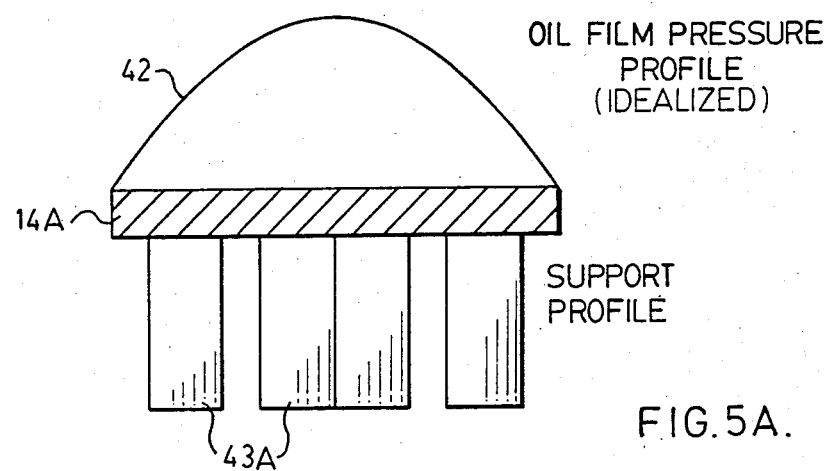
FIG. 5A is a representation of a shoe having an idealized oil film pressure profile with a differently spaced support profile.
Figure 5B:
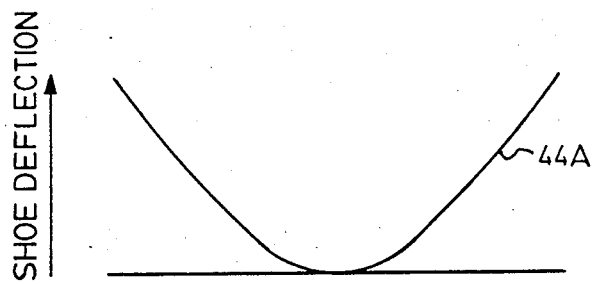
FIG. 5B is a curve indicating, as an example, a shoe deflection that might be associated with the support profile of FIG. 5A.

Referring to FIG. 5A, the same curve 42 is shown above the cross-section through the elemental strip 40 (FIG. 3B) of shoe 14A. Again the support effort is shown beneath shoe 14A and is represented by blocks 43A. In FIG. 5A the support effort, that is the supporting pistons 26 (FIG. 2), are distributed differently with the outer pistons moved towards the edges. FIG. 5B shows, as an example, the shoe deflection (exaggerated in scale), as represented by curve 44A, that might occur with the support effort distributed towards the edges of the shoe. It will be seen that the shoe surface is concave, as represented by curve 44A, because a portion of the support has been placed too close to the edges of shoe 14A.

Figure 6:
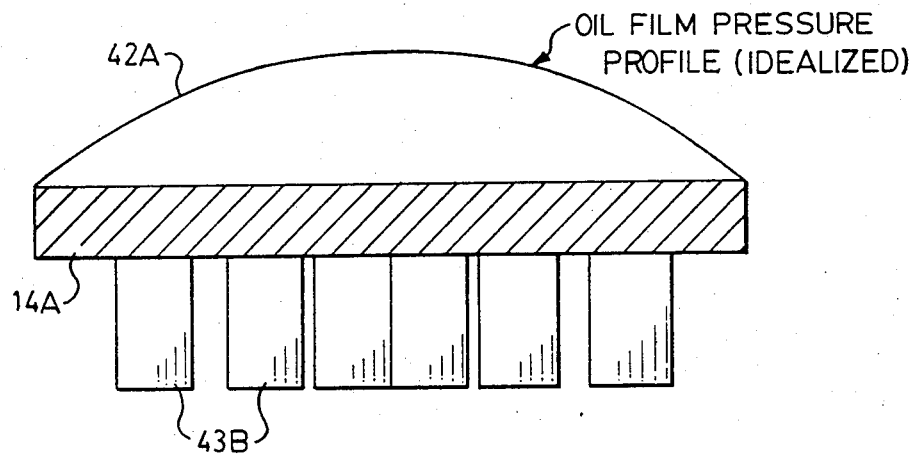
FIG. 6 is yet another representation of a shoe having an idealized oil film pressure profile with a more widely distributed support profile.

It will be apparent from FIGS. 4 and 5 that the support elements 15 (cylinders 27 and pistons 26), FIG. 2, could be distributed or positioned to achieve a substantially planar surface on shoe 14 (FIGS. 1 and 2). Referring to FIG. 6, there is shown a curve 42A representing an idealized oil film pressure profile with blocks 43B representing the support effort provided by six hydraulic elements distributed more in accordance with the curve 42A. Calculations made for a number of transverse elemental strips 40 extending along shoe 14A (FIG. 3B) and for a number of radial strips 41 (FIG. 3B) extending across shoe 14A may serve to determine the placement or distribution of the hydraulic elements 15 (FIG. 2). In practice, it may, for the purpose of determining the positions of the hydraulic elements 15, be convenient to treat the shoe as a plate rather than as a series of elements or beams, and to perform the necessary calculations with reference to a plate. By whatever computational means, it will be apparent that a desired oil film pressure profile can be closely approximated on the underside of a shoe by a plurality of supporting hydraulic elements suitably distributed and spaced from one another but having a common oil pressure. The amount of "sag" between the supporting hydraulic elements can be controlled by the selection of an appropriate shoe thickness. In general, thinner shoes require the use of a greater number of smaller sized hydraulic support elements. Thinner shoes are desirable as they are less prone to affect the oil film pressure profile as a consequence of thermal distortions either in the rotating ring or in the shoe itself.

In the design of the supporting hydraulic elements, it will be seen that another variable is available to the designer. Instead of having the hydraulic elements, for example cylinders with pistons, all with the same diameter, the use of different diameters may be used to provide different supporting force per unit bearing area.

The present invention provides a substantially planar surface on the bearing surface of each shoe. The aforementioned Canadian Pat. No. 1,116,671 is also concerned with this. However, this aforementioned patent describes a mechanical supporting arrangement where a segment support plate or base is mounted on a centrally positioned pivot arrangement which, unless the support plate is exceedingly massive, will tend to crown or form a convex upper surface. The mechanical support elements which extend from the support plate to the shoe segment do not have any form of automatic equalization as between support elements associated with a particular shoe or as between support elements for all shoes.

It is therefore believed that the present invention provides an improved support for a thrust bearing for a vertical shaft machine. It will also be apparent that the support arrangement of the invention may be used for thrust bearings in machines where the shaft is not vertical.

What I claim as new and desire to secure by Letters Patent of the United States is:

1. A thrust bearing for a rotating shaft, comprising:
   a rotating ring mounted to said shaft for rotation with said shaft and having a bearing surface in a plane at right angles to the axis of said shaft,
   a fixed base ring positioned around said shaft,
   a plurality of segmented bearing shoes, each having a bearing surface facing the bearing surface of said rotating ring,
   a plurality of hydraulic elements for each of said shoes, said hydraulic elements extending from said base ring to a respective shoe for supporting said respective shoe, a manifold connected to a source of hydraulic fluid under pressure, connection means connecting each said hydraulic element to said manifold to provide hydraulic fluid under pressure to each said hydraulic element for urging the bearing surface of the respective shoe towards the bearing surface of said rotating ring, and means for providing a film of oil between said bearing surfaces of said shoes and the bearing surface of said rotating ring, said hydraulic elements for each shoe being distributed and arranged to support said respective shoe in a pressure pattern which approximates an ideal oil film pressure pattern for providing a substantially planar bearing surface of said shoe under operating load conditions.

2. A thrust bearing for a vertical shaft machine, comprising:

a rotating ring mounted to the vertical shaft of said machine for rotation with said shaft and having a downwardly directed bearing surface, a fixed base ring positioned around said shaft, a plurality of segmented bearing shoes, each having an upwardly directed bearing surface facing the bearing surface of said rotating ring, a plurality of hydraulic elements for each of said shoes, said hydraulic elements extending upwardly from said base ring to support a respective shoe, a manifold connected to a source of hydraulic fluid under pressure, connection means connecting each said hydraulic element to said manifold to provide said hydraulic fluid under pressure to each said hydraulic element for urging the bearing surface of said respective shoe towards the bearing surface of said rotating ring, and means for providing a film of oil between the bearing surfaces of said shoes and the bearing surface of said rotating ring, said hydraulic elements for each said shoe being distributed and arranged to support said respective shoe in a pressure pattern which approximates an ideal oil film pressure pattern for providing a substantially planar bearing surface of said shoe under operating load conditions.

3. A thrust bearing as defined in claim 2 in which said hydraulic elements comprise cylinders at least partly formed in said base ring and a piston in each cylinder having sliding longitudinal movement in said cylinder in response to changing volume of hydraulic fluid in said cylinder, each piston having means engaging a respective shoe to support said shoe.

4. A thrust bearing as defined in claim 2 in which said hydraulic elements comprise flexible bellows type chambers which are flexible in a longitudinal direction parallel to the axis of said shaft in response to changing volume of hydraulic fluid in the chamber, each chamber having means for mounting to said base ring and for engagement with a respective shoe.

5. A thrust bearing as defined in claim 2 in which said manifold is adjacent the periphery of said base ring.

6. A thrust bearing as defined in claim 2 in which said means for providing a film of oil between said bearing surfaces of said shoes and the bearing surface of said rotating ring comprises spaced walls extending upwardly from said base ring providing a container for receiving lubricating liquid for immersing said bearing surfaces to provide lubrication.

7. A thrust bearing for a dynamoelectric machine having a stator mounted on a fixed frame and a rotor, said rotor being mounted on a vertically extending shaft for rotation within said stator, said thrust bearing comprising:

a rotating ring mounted to said vertically extending shaft for rotation with said shaft and having a downwardly directed bearing surface, a stationary base ring positioned around said shaft beneath said rotating ring and mounted to said frame, a plurality of segmented bearing shoes adjacent one another around said shaft, each shoe having an upwardly directed bearing surface facing the bearing surface of said rotating ring, a plurality of hydraulic elements for each of said shoes, said hydraulic elements being mounted to said base ring and extending upwardly to support a respective shoe, a manifold for connection to a source of hydraulic fluid under pressure, tubular connection means connecting each said hydraulic element to said manifold for providing hydraulic fluid under pressure equally to each said hydraulic element, and means for providing a film of lubricating oil between the bearing surfaces of said shoes and the bearing surface of said rotating ring, said hydraulic elements for each shoe being so distributed and arranged to support each shoe in a pressure pattern which approximates an ideal oil film pressure pattern for providing a substantially planar bearing surface of said shoe under load operating conditions.

8. A thrust bearing as defined in claim 7 in which said hydraulic elements comprise cylinders at least partly formed in said base ring and a piston in each cylinder for providing sliding engagement with the walls of said cylinder for sliding longitudinal movement of said pistons in response to changing volume of hydraulic fluid in said cylinders, each piston having means for engaging the undersurface of a shoe to contribute to the support of said shoe, and in which a portion of said tubular connection means extends within said base ring to the bottom of each cylinder.

* * * * *